United States Patent [19]
Bryan et al.

[11] Patent Number: 5,916,515
[45] Date of Patent: Jun. 29, 1999

[54] TWO-STAGE LAMINATION PROCESS

[75] Inventors: Aiden Bryan, Belfast, United Kingdom; Steven D. Cochran, Henderson, Nev.

[73] Assignee: Valence Technology, Inc., Henderson, Nev.

[21] Appl. No.: 08/807,607

[22] Filed: Feb. 27, 1997

[51] Int. Cl.⁶ .................................................. H01M 10/04
[52] U.S. Cl. ........................................ 29/623.3; 156/312
[58] Field of Search ......................... 29/623.3; 156/182, 156/312

[56] References Cited

U.S. PATENT DOCUMENTS

| | | | |
|---|---|---|---|
| 3,180,778 | 4/1965 | Rinderspacher et al. | 156/312 X |
| 3,584,758 | 6/1971 | Moore et al. | 156/182 X |
| 4,529,672 | 7/1985 | Howard et al. | 429/42 |
| 4,938,833 | 7/1990 | Kaufman et al. | 156/312 X |
| 5,536,278 | 7/1996 | St-Amant et al. | 29/623.3 |

*Primary Examiner*—Stephen Kalafut
*Attorney, Agent, or Firm*—James Hsue

[57] ABSTRACT

Blisters or air bubbles between battery layers can be a problem with the lamination of battery layers. The blistering can be reduced by a two-step pressure-applying method. In the first step, a relatively small first pressure is applied to the battery layers. The relatively small first pressure is done such that air bubbles between the battery layers are not formed. Next, a second larger pressure is applied to the battery layers to laminate the battery layers together. In an alternate embodiment, the pressure applied to the battery layers is changed from a low pressure to laminating pressures in one step.

23 Claims, 2 Drawing Sheets

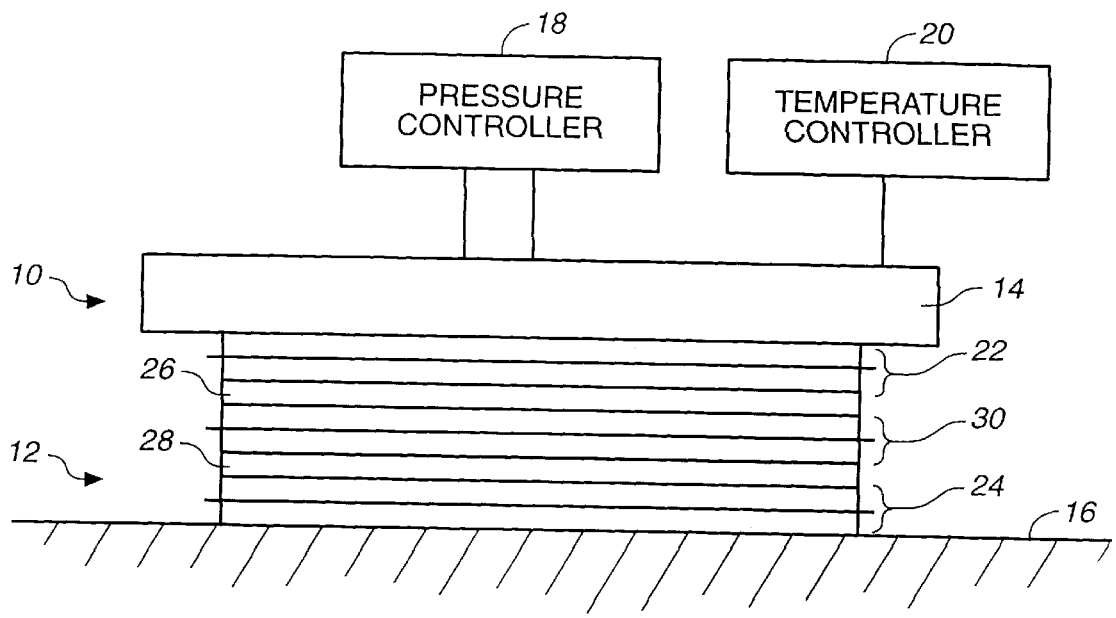
FIG._1
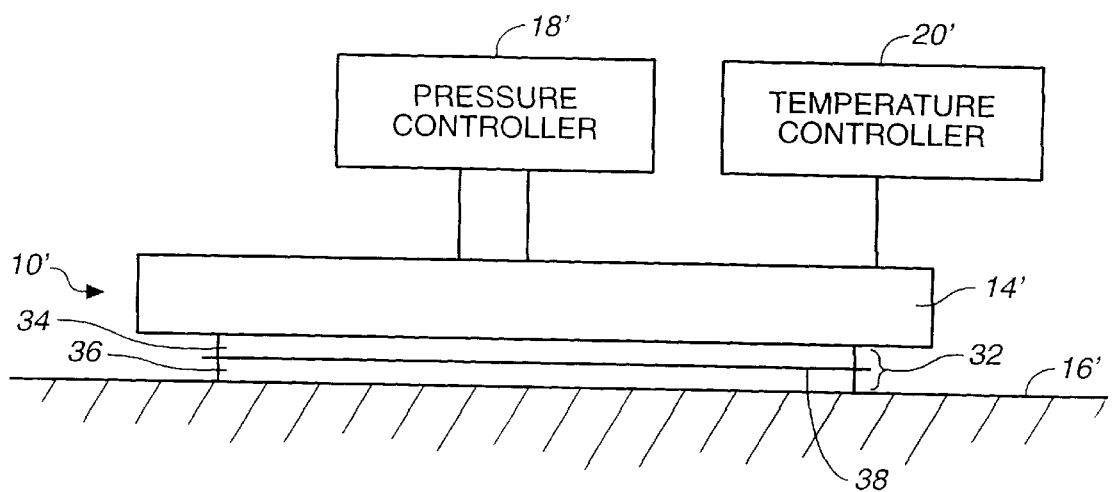
FIG._2

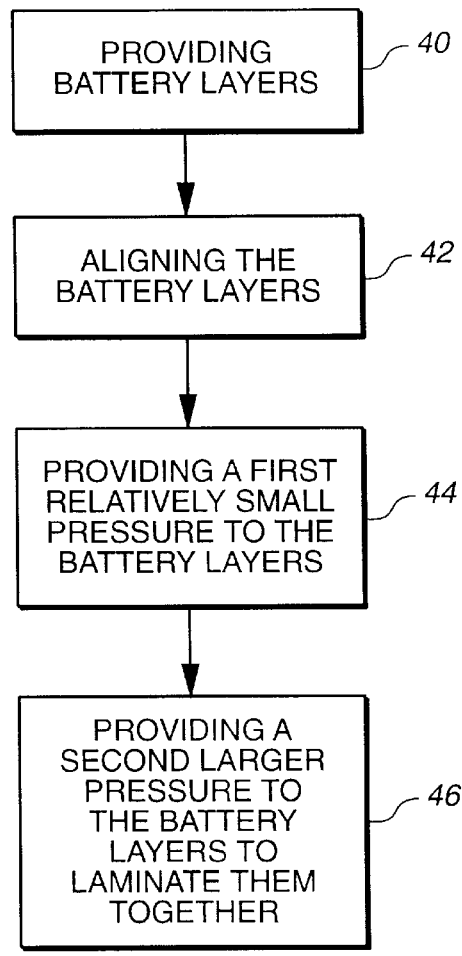
FIG._3
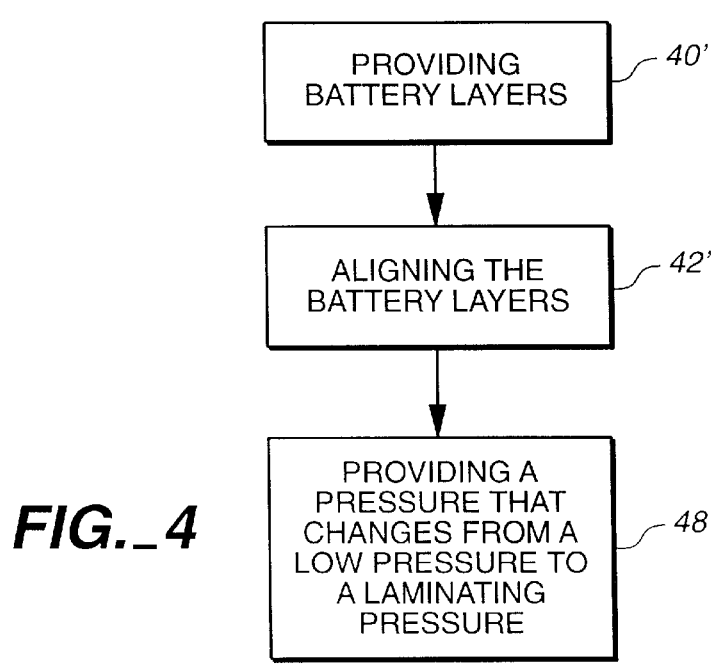
FIG._4

TWO-STAGE LAMINATION PROCESS

BACKGROUND OF THE INVENTION

The present invention relates to laminar batteries. Laminar batteries include battery layers which are laminated together to form a relatively flat unit.

One way of laminating the batteries together is with a rotary press. In the rotary press method, the battery layers are radiantly heated and then laminated by being squeezed with the rotary press. A problem with using a rotary press to laminate the battery layers together is that the rotary press can create undesirable stresses in the battery layers. Additionally, the rotary press itself cannot efficiently transfer heat to the battery layers because the rotary press contacts each battery location for a short period of time. For this reason, the battery layers are typically heated with a radiant heat source.

It is desired to have a method of forming a battery that avoids these problems.

SUMMARY OF THE INVENTION

A flat press can be used to laminate the battery layers. The flat press can press down on the entire top and bottom surface of the stack of battery layers and thus avoid creating stresses in the battery layers. Additionally, the flat press can contact-heat the battery layers. Contact heating is more efficient than radiant heating.

A problem with using a flat press is that air bubbles or blisters can be formed between the battery layers. The air bubbles or blisters are most noticeable between a separator layer and an electrode section. These air bubbles or blisters can reduce the efficiency of the battery.

The inventors have found that the bubbles or blisters can be avoided by supplying low pressure to the battery layers in a pre-lamination step. The pre-lamination step allows for the removal of air bubbles. Afterward, in an additional pressure-applying step, a greater lamination pressure is applied to laminate the battery layers together.

The combination of these two steps reduces the amount of air bubbles that are trapped between the battery layers and thus maintains battery efficiency. Additionally, the two-step process described above can speed up the production of the battery sections. A single high-pressure step would require a longer period of time to ensure the removal of any air bubbles or blisters.

An alternate embodiment of the present invention uses a single pressure-applying step in which the pressure is changed from low pressures to the laminating pressure. The initial pressures can be low for a short period of time to avoid air bubbles, and then spike up to a higher laminating pressure.

Yet another embodiment of the present invention uses a flat press at a relatively low plate speed to press on the battery layers. The plate can be moved down toward the battery layers at a relatively high rate of speed. When the plate is a predetermined distance from the battery layers, the speed can be reduced. The lower plate speed when the plate contacts the battery layers allows for the air bubbles to escape.

BRIEF DESCRIPTION OF THE DRAWINGS

FIG. 1 is a diagram of the flat press used in the method of the present invention, and a stack of battery layers.

FIG. 2 is a diagram showing a flat press along with an electrode section made of different battery layers.

FIG. 3 is a flow chart of an embodiment of the present invention.

FIG. 4 is a flow chart of an alternate embodiment of the present invention.

DETAILED DESCRIPTION OF THE PREFERRED EMBODIMENT

FIG. 1 shows a flat press 10 used to provide the pressure to the battery layers 12 as described in the method of the present invention. The flat press 10 has a top plate 14 and bottom plate 16, which are used to provide pressure onto the battery layers 12. Pressure controller 18 determines the pressure between the plates 14 and 16. Temperature controller 20 allows for the heating of the flat press device. The heat can be provided by coils (not shown) at plates 14 and 16. In a preferred embodiment, the stack of battery materials 12 includes cathode sections 22 and 24, separator sections 26 and 28, and an anode section 30. The cathode sections 22 and 24 are made of a lithium metallic oxide material surrounding the central current collector metal mesh. The lithium metallic oxide is preferably a lithium manganese oxide or a lithium cobalt oxide. The separator materials 26 and 28 are made of a polymer material which allows for an ion flow between the anode and cathode sections. In the preferred embodiment, the anode section 30 is comprised of conductive carbon-based material around a central current collector metal mesh. The carbon-based material can be carbon graphite or coke material.

FIG. 2 is a diagram showing the press 10' used to laminate the layers to form an electrode section 32. The electrode section 32 includes two layers of active material 34 and 36, and a central current collector metal mesh 38. The press can be used to laminate the two active layers 34 and 36 about the current collector mesh. The electrode section 32 can be an anode section or a cathode section.

FIG. 3 is a flow chart of a method of the present invention. In step 40, battery layers are provided. These battery layers could be a stack of anode sections, cathode sections, and separators, as shown in FIG. 1, or could be the active material layers and current collector used to form an electrode section, as shown in FIG. 2. In step 42, these battery layers are aligned as desired. A mechanical fixture could be used to provide for the aligning of the battery layers. In step 44, a first relatively small pressure is provided to the battery layers. This pressure can be a negligible pressure such as about one pound per square inch. This low pressure provided to the battery layers prevents the air bubbles from forming. This is believed to be because the low pressure does not fully laminate the battery sections together and thus allows air bubbles to easily escape from between the different battery layers. Air bubbles and blistering are especially a problem between the separator and electrode sections. In a preferred embodiment, this first relatively small pressure-providing step takes about two seconds.

In step 46, a second larger pressure is provided to the battery layers to laminate them together. This second higher pressure uses a laminating pressure that laminates the layers together. Since the first lower pressure step has been done, fewer air bubbles or blisters will be trapped between different layers. In preferred embodiment, these higher pressures are in the range of about 40 to 250 pounds per square inch of pressure on the battery components. This higher pressure-providing step preferably is done for a longer period of time than the first step. In a preferred embodiment, the higher pressure is provided for about four seconds.

The total time for steps 44 and 46 in a preferred embodiment is about six seconds. This is acceptable for the high-speed battery production. Single-step processes may take about twelve to fifteen seconds in order to reduce the amount of blistering or bubbling. This amount of time can unacceptably slow battery production.

Preferably, the same press could be used for steps 44 and 46. The press can go down to provide the low pressure, come up and have the pressure gauge re-set to the higher laminating pressure, and then come down again. Alternately, two presses could be used, one to provide the lower pressure and one to provide the laminating pressure.

In a preferred embodiment, the battery layers are heated by the contact to the flat press which is at a temperature of around 100–130° C. The flat plate will give better conduction of heat than radiant heating used with the roller press lamination methods.

FIG. 4 shows an alternate embodiment of the present invention. In this alternate embodiment, the pressure is changed from a low pressure to avoid air bubbles to a greater laminating pressure in the single step 48. In a preferred embodiment, the initial pressure is below 40 pounds per square inch for a period of time to reduce the creation of air bubbles and thereafter increases to 40 pounds per square inch, most preferably 40–250 psi, to laminate the battery layers together. The period of time that the pressure is below 10 pounds per square inch is preferably around 2 seconds.

In yet another embodiment of the present invention, the top plate of the flat press can be adjusted to come down at a relatively high rate of speed until the plate is near the battery layers. At that time, the plate speed can be reduced so that the battery layers are pressed together slowly to allow air bubbles to escape. In a preferred embodiment, the speed of the plate can be changed when the plate is a predetermined distance from the battery layers. The applied pressure can be modified as discussed above in the other embodiments, or kept constant.

Various details of the implementation and method are merely illustrative of the invention. It will be understood that various changes in such details may be within the scope of the invention, which is to be limited only by the appended claims.

What is claimed is:

1. A method comprising the steps of:
   providing battery component layers;
   applying pressure to the battery component layers in a first pressure applying step, the first pressure applying step being done at a first pressure; and
   thereafter, laminating the battery component layers together in a second pressure applying step, the second pressure applying step being done at a second pressure which is greater than the first pressure, wherein the pressure applying steps are done with a flat press.

2. The method of claim 1, further comprising the step of aligning the battery component layers before the pressure applying step.

3. A method comprising the steps of:
   providing battery component layers;
   applying pressure to the battery component layers in a first pressure anplying step, the first pressure applying step being done at a first pressure; and
   thereafter, laminating the battery component layers together in a second pressure applying step, the second pressure applying step being done at a second pressure which is greater than the first pressure, wherein the second pressure applying step is done for a greater period of time than the first pressure applying step.

4. The method of claim 1, wherein the battery component layer providing step includes providing a polymer separator.

5. A method comprising the steps of:
   providing battery component layers, the battery component layers including a polymer separator positioned between a cathode section and an anode section;
   applying pressure to the battery component layers in a first pressure applying step, the first pressure applying step being done at a first pressure; and
   thereafter, laminating the battery component layers together in a second pressure applying step, the second pressure applying step being done at a second pressure which is greater than the first pressure.

6. The method of claim 5, wherein the battery component layers providing step is such that the layers include the cathode section, the polymer separator, the anode section, a second polymer separator and a second cathode section.

7. The method of claim 1, wherein the battery component layers providing step is such that the layers include electrode layers and a current collector so that the pressure applying steps form an electrode section out of the battery component layers.

8. The method of claim 1, wherein the flat press is heated.

9. The method of claim 8, wherein the flat press is heated to a temperature of about 100–130° C.

10. A method comprising the steps of:
    providing battery component layers;
    applying pressure to the battery component layers in a first pressure applying step, the first pressure applying step being done at a first pressure; and
    thereafter, laminating the battery component layers together in a second Pressure applying step, the second pressure applying step being done at a second pressure which is greater than the first pressure, wherein the second pressure applying step applies the second pressure in the range 40–250 pounds per square inch.

11. A method comprising the steps of:
    providing battery component layers; and
    applying a changing pressure to the battery component layers during the lamination of the battery component layers, the pressure changing from a first pressure to a second pressure greater than this first pressure.

12. The method of claim 11 wherein the changing pressure is below 40 pounds per square inch for a period of time so as to reduce the creation of air bubbles and thereafter the changing pressure increases to a pressure above 40 pounds per square inch to laminate the battery component layers together.

13. The method of claim 11, further comprising, before the pressure applying step, the step of aligning the battery component layers.

14. The method of claim 11, wherein the pressure applying step is done with a flat press.

15. The method of claim 14, wherein the flat press is heated.

16. The method of claim 11, wherein the battery component layer providing step includes providing a polymer separator.

17. The method of claim 16, wherein the battery component layer providing step is such that the polymer separator is positioned between a cathode section and an anode section.

18. The method of claim 11, wherein the battery component layer providing step is such that the layers include a first cathode section, a first polymer separator, a first anode section, a second polymer separator and a second cathode section.

19. The method of claim 11, wherein the battery component layers providing step is such that the layers include electrode layers and a current collector so that the pressure applying steps form an electrode section out of the battery component layers.

20. A method comprising the steps of:

providing battery component layers;

placing the battery component layers in a flat press; and moving a top plate of the flat press toward the battery component layers at a first rate of speed until the plate is near the battery component layers and thereafter pressing on the plates at a second lower rate of speed.

21. The method of claim 20 further comprising the steps of applying pressure to the battery component layers in a first pressure applying step at a first pressure, and thereafter laminating the battery component layers together in a second pressure applying step being done at a second pressure which is greater than the first pressure.

22. The method of claim 20, further comprising the step of applying a changing pressure to the battery component layers during the lamination of the battery component layers, the pressure changing from a first pressure to a second pressure greater than the first pressure.

23. The method of claim 20, wherein the flat press is heated.

* * * * *